United States Patent [19]

Edge

[11] 4,402,722
[45] Sep. 6, 1983

[54] COOLING ARRANGEMENT AND METHOD FOR FORMING FLOAT GLASS

[75] Inventor: Charles K. Edge, Sarver, Pa.

[73] Assignee: PPG Industries, Inc., Pittsburgh, Pa.

[21] Appl. No.: 344,421

[22] Filed: Feb. 1, 1982

[51] Int. Cl.³ .............................................. C03B 18/18
[52] U.S. Cl. ..................................... 65/99.3; 65/99.5; 65/182.3; 65/182.4
[58] Field of Search ....................... 65/99.2, 99.3, 99.4, 65/99.5, 182.4, 182.3

[56] References Cited

U.S. PATENT DOCUMENTS

| | | | |
|---|---|---|---|
| 3,333,936 | 8/1974 | Warren | 65/99.2 |
| 3,531,274 | 9/1970 | Dickinson et al. | 65/99 |
| 3,843,344 | 10/1974 | Galey | 65/99.2 |

Primary Examiner—Arthur D. Kellogg
Attorney, Agent, or Firm—Dennis G. Millman

[57] ABSTRACT

In a float glass forming chamber, the effects on the glass of sharp temperature gradients associated with coolers are modulated by high mounting of coolers so as to improve the distortion quality of the glass. Preferably, an elevated roof section is provided to accommodate the cooling means.

14 Claims, 2 Drawing Figures

COOLING ARRANGEMENT AND METHOD FOR FORMING FLOAT GLASS

BACKGROUND OF THE INVENTION

This invention relates to the process of forming flat glass known as the float process, wherein molten glass is delivered onto a pool of molten metal, and attenuated to a ribbon of desired thickness. Glass entering the float forming chamber or "bath" is initially at a relatively high temperature, e.g., around 2000° F. (1100° C.), so as to be relatively fluid, but during its passage along the float chamber, the glass must cool to a condition suitable for engagement with attenuating devices, e.g., around 1400° F. (760° C.) to about 1700° F. (930° C.), and subsequently must be cooled further to a dimensionally stable condition so as to be withdrawn from the forming chamber, typically at about 1100° F. (600° C.). The molten metal (usually molten tin or a alloy thereof) and the atmosphere within the forming chamber are generally at a temperature lower than the glass temperature, and thus, considerable cooling of the glass takes place naturally by losing heat to the surroundings in the forming chamber. However, it is sometimes desired to employ cooling means to improve the cooling rate so as to shorten the forming chamber or to alter the temperature profile across the ribbon of glass. For these purposes, it has been common to utilize heat exchangers typically comprising metal walled conduits carrying water as the heat exchange medium. Float forming chambers also typically include heating means to help establish thermal conditions within the chamber. The use of coolers and heaters in combination to control thermal conditions within a float forming chamber are shown, for example, in U.S. Pat. No. 3,531,274 (Dickinson et al.).

It has now been found that coolers as previously employed in the art may detrimentally affect the optical quality of the glass being produced. It is believed that the sharp thermal gradient in the vicinity of a cooler may lead to undesirable viscous stresses on the top surface of the glass ribbon as it passes beneath the cooler and that the viscous stresses lead to top surface thickness variations in the glass which are evidenced as distortion of transmitted light. It would be desirable to cool the glass ribbon passing through a float forming chamber without the penalty of reduced optical quality.

SUMMARY OF THE INVENTION

The present invention is based on the recognition that a cooler carrying a heat transfer fluid that is typically at least 1000° F. (556° C.) below the temperature of the adjacent glass (e.g., water at or below 100° C., glass at 900° C.), creates sharp thermal gradients in a float chamber, and that these sharp thermal gradients can detrimentally affect the glass ribbon unless they are modulated. Moreover, the local thermal gradient of a cooler with its surroundings is greater than that of a typical heater in a forming chamber. Accordingly, the conventional practice of placing coolers relatively close to the ribbon as shown in the aforementioned U.S. Pat. No. 3,531,274 has negative implications as to the optical quality of the glass.

In the present invention the cooling effect of a cooler on the glass ribbon is modulated by spacing the cooler or coolers higher above the glass level than is conventional. Thus, while it is common for coolers in the prior art to be spaced less than about 25 centimeters above the glass ribbon (often 10 centimeters or less), the present invention contemplates spacing coolers at least 50 centimeters above the glass ribbon. Expressed another way, the coolers should be no closer to, and preferably farther from, the glass than the heaters present in the forming chamber. Most preferably, a raised section may be provided in the float forming chamber to form a recess within which the coolers may be housed at an elevation above the roof line of the main portion of the forming chamber.

THE DRAWINGS

DETAILED DESCRIPTION

In order to provide a better understanding of the invention, the preferred embodiment will be described in detail. The particular float forming chamber structure described is a type particularly suited to the preferred embodiment of the invention, but it should be understood that other types of forming chamber structures may be employed with the present invention.

Figure 1:
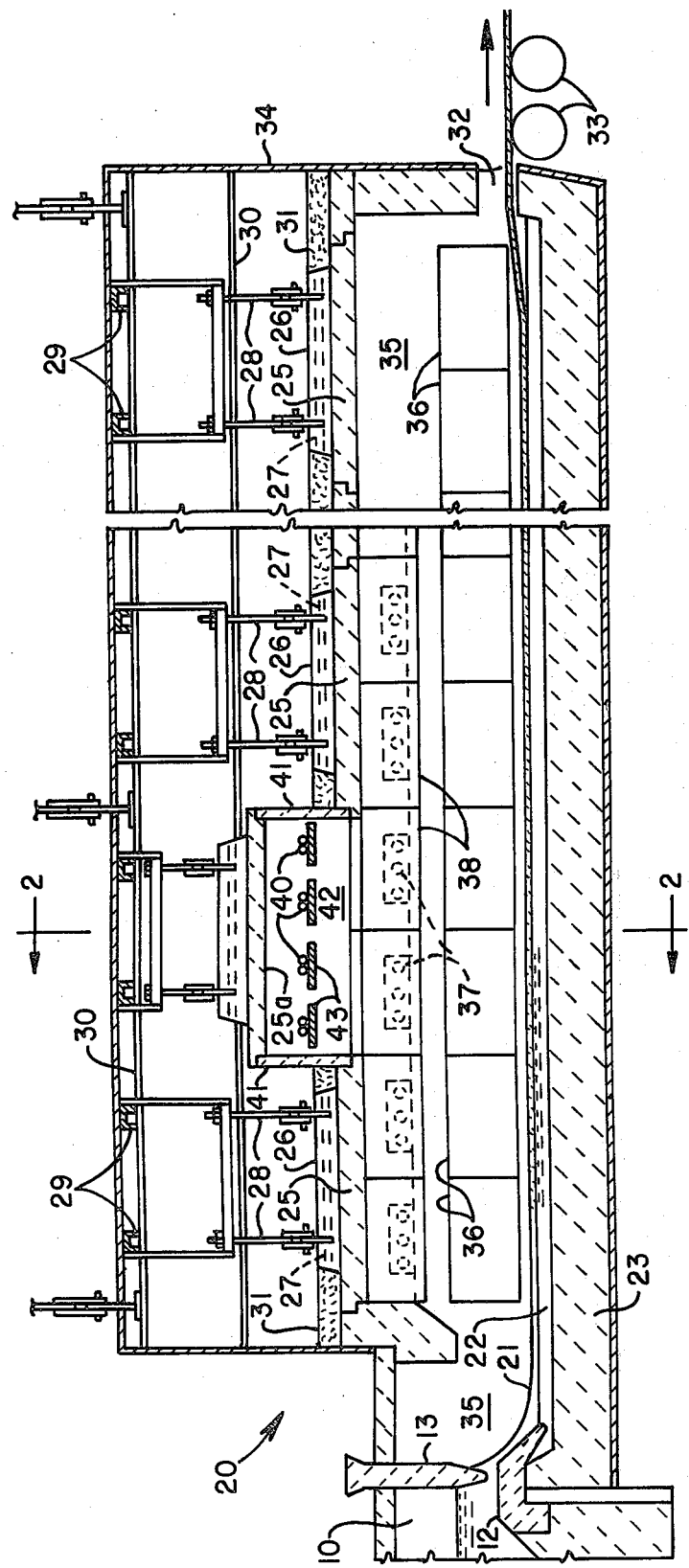
FIG. 1 is a longitudinal cross-sectional view of a float glass forming chamber having an elevated roof section for coolers in accordance with a preferred embodiment of the invention.

In the arrangement shown in FIG. 1, a channel 10 carries a stream of molten glass 11 from a melting furnace (not shown) to the float forming chamber designated generally as 20. The molten glass is metered into the forming chamber between a threshold 12 and a vertically adjustable tweel 13. Within the forming chamber the molten glass forms a ribbon 21 supported by a pool of molten metal 22, usually molten tin. The molten metal is contained within a refractory basin 23.

The type of forming chamber roof shown is comprised of horizontal refractory slabs 25 interfitting with one another in shiplap fashion. Ribs 26 on the upper side of the slabs 25 carry a weight distributing pipe 27 engaged by hanger means 28 which are supported from above by transverse beam members 29. Major support for the roof structure is provided by longitudinal beams 30 on which the transverse beams 29 rest. This particular roof design is described in greater detail in U.S. patent application Ser. No. 222,396 filed Jan. 5, 1981, the disclosure of which is hereby incorporated by reference. A layer of insulation 31 may be applied to the top side of the roof slabs. The entire forming chamber may be encased in a metal casing 34 in order to render the chamber substantially gas-tight since it is customary to maintain a non-oxidizing atmosphere within the chamber.

After the glass ribbon 21 has been attenuated to a desired thickness and width, it is withdrawn from the forming chamber through an exit opening 32 where it is lifted from the molten metal support by lift out rolls 33.

The forming chamber also consists of suspended side walls 35 spaced above the basin 23 to provide an access openings which are plugged by side seals 36. It is through the side seal area that atenuating devices (not shown) and conventional prior art coolers may be inserted into the forming chamber. Typically, electrical resistance heating elements extend vertically through the roof of a float forming chamber, but the more advanced arrangement shown in FIGS. 1 and 2 involves electrical resistance heating elements 37 extending horizontally into the chamber through the side walls 35. The inner ends of the heating elements 37 are supported by ceramic hangers 38.

Figure 2:
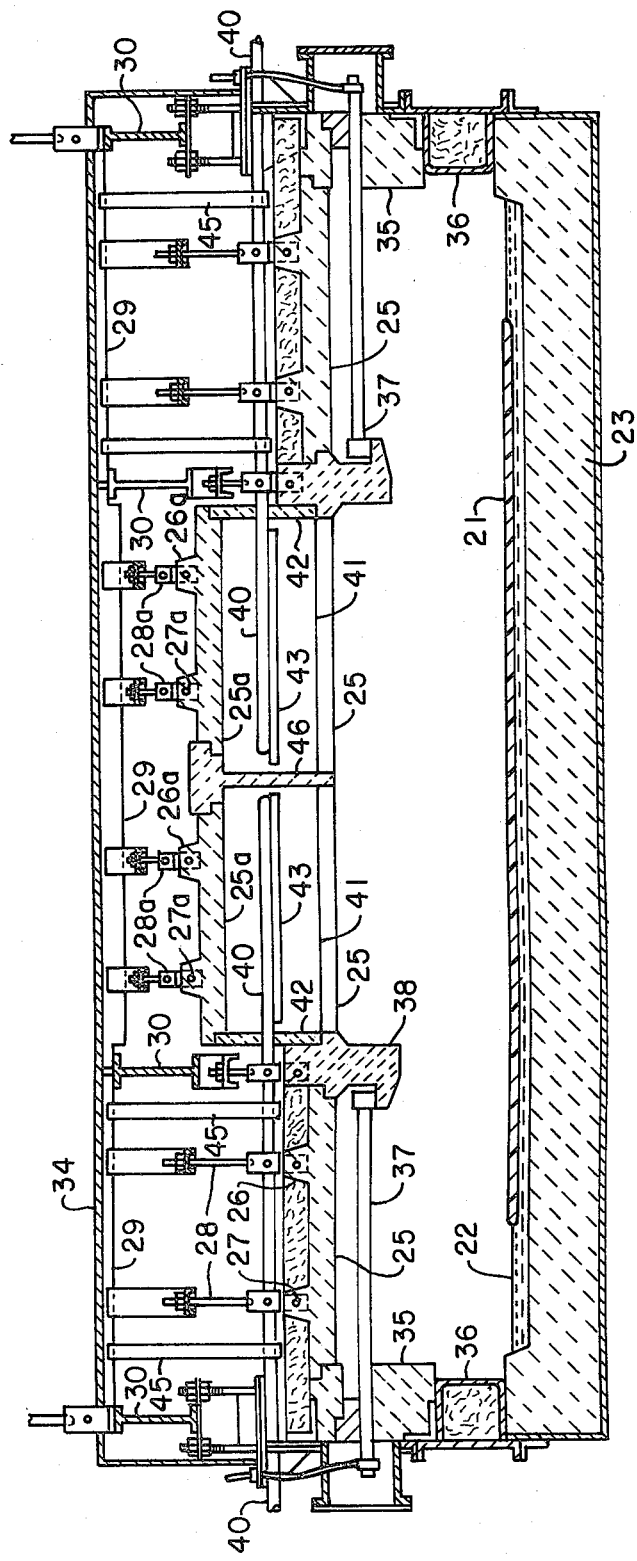
FIG. 2 is a transverse cross-sectional view along line 2—2 in FIG. 1.

Shown in the drawings is an example of the preferred embodiment wherein a raised roof section is provided for accommodating coolers. In this example the raised roof section involves two roof slabs 25a in the center portion of the roof which are supported at an elevation above the overall roof line of the forming chamber. The exact location and extent of the raised portion will depend upon the cooling requirements of a particular operation and may vary from the example described here. As shown in FIG. 2, the raised roof cooling section may comprise about one half the width of a float forming chamber, but in some cases it may be desirable for the zone to extend across the full width of the chamber or in other cases, to be even narrower than one half the width. As can be seen in FIG. 1, the raised roof cooling section of the example involves one roof section and accommodates four hairpin type water coolers 40, but obviously the cooling section may be provided with fewer coolers or may be enlarged in the longitudinal direction to include a greater number of coolers. An adjacent roof section may be raised to create a larger cooling zone, or one or more separate raised roof zones may be provided. A cooling zone may be located anywhere along the length of the forming chamber but more typically in the upstream half of its length and, most preferably in the first one quarter of its length. As depicted in FIG. 1, the raised cooling zone is in the second row of roof slabs from the entrance end, and another particularly useful location would be in the first row of roof slabs.

The raised roof heating zone is enclosed by end walls 41 and side walls 42. The coolers 40 as shown extend from opposite sides through their respective side walls 42. An additional feature of the cooling arrangement shown is the capability of rotating the coolers to vary their cooling effect. Heat shields 43 are affixed to one side of each cooler so as to at least partially shield the cooler from radiated heat when the shield is rotated to the underside of the cooler. Each cooler may be rotatably supported outside the cooling zone on support legs 45. In FIG. 2 a partition wall 46 is shown dividing the cooling zone into halves so that the cooling rate can be independently controlled from side to side. Such a partition is optional and without the partition a single cooler may extend across the entire width of the cooling zone. Since the type of cooler is not critical to the invention, the coolers may take a wide variety of shapes and forms and may extend into the cooling zone from any horizontal direction or vertically through the top.

The slab type roof structure of the illustrated example is particularly compatible with the raised roof embodiment of the present invention since a raised roof section may be provided simply by providing shortened hanger means 28a. Likewise, the location of the cooling zone or zones can be changed relatively easily, or additional zones added, since a major reconstruction is not required.

Other variations and modifications as would be known to those of skill in the art may be resorted to without departing from the spirit and scope of the invention defined by the claims which follow.

I claim:

1. Apparatus for forming flat glass while supported on a pool of molten metal comprising: an enclosed forming chamber adapted to contain a pool of molten metal; means for delivering a stream of molten glass onto the molten metal in a delivery section of the forming chamber; the forming chamber downstream of the delivery section comprising an elongated main forming section adapted to pass a ribbon of glass being formed, the main forming section having in a major portion thereof a first generally horizontal interior roof elevation, and in a minor portion thereof, a second generally horizontal roof elevation higher than the first elevation overlying the path taken by the glass ribbon; a plurality of heating means within the main forming section above the molten metal pool and below the first roof elevation; and cooling means in the minor portion of the forming chamber above the first roof elevation at an elevation sufficiently spaced above the glass ribbon to diffuse the cooling effect relatively uniformly over the glass ribbon.

2. The apparatus of claim 1 wherein the cooling means comprises a conduit adapted to contain a fluid heat transfer medium.

3. The apparatus of claim 2 wherein the cooling means comprises a plurality of said conduits.

4. The apparatus of claim 2 wherein the conduit is in communication with a source of water.

5. The apparatus of claim 2 wherein the conduit extends generally horizontally into the forming chamber and is adapted to rotate about a generally horizontal axis and the conduit has a heat shield affixed to one side of at least portions of its length.

6. The apparatus of claim 1 wherein the exposed portions of the cooling means overlie less than the full width of the chamber.

7. The apparatus of claim 1 wherein exposed portions of the cooling means overlie no more than 50% of the interior width of the chamber.

8. The apparatus of claim 1 wherein the cooling means are supported at least 50 centimeters above the molten metal pool.

9. A method of forming flat glass wherein molten glass is supported on a pool of molten metal in an enclosed forming chamber as it is formed into a ribbon of glass, comprising: delivering a stream of molten glass to a delivery section of a forming chamber; passing the glass from the delivery section to an elongated main forming section of the forming chamber; in the main forming section modulating the temperature of the glass ribbon being formed by a plurality of heating means above the glass ribbon and below the major roof elevation of the main forming section, and by cooling means in a minor portion of the main forming chamber at an elevation above the major roof elevation and spaced sufficiently above the glass ribbon to diffuse the cooling effect relatively uniformly over the glass ribbon.

10. The method of claim 9 wherein the cooling is effected by passing water through a conduit whose surface is exposed to the glass ribbon.

11. The method of claim 9 wherein cooling is effected by passing heat exchange medium through a plurality of conduits having surface portions within the chamber.

12. The method of claim 11 wherein exposed portions of the conduits overlie less than the full width of the glass ribbon.

13. The method of claim 9 wherein cooling is carried out within the first half of the passage of the glass ribbon along the chamber.

14. The method of claim 9 wherein the glass ribbon is passed beneath the cooling means at a spacing of at least 50 centimeters.